Jan. 10, 1967  SHAO-TANG LEE  3,297,280
AIRCRAFT WITH INFLATABLE LANDING GEAR
Original Filed June 15, 1964  2 Sheets-Sheet 2
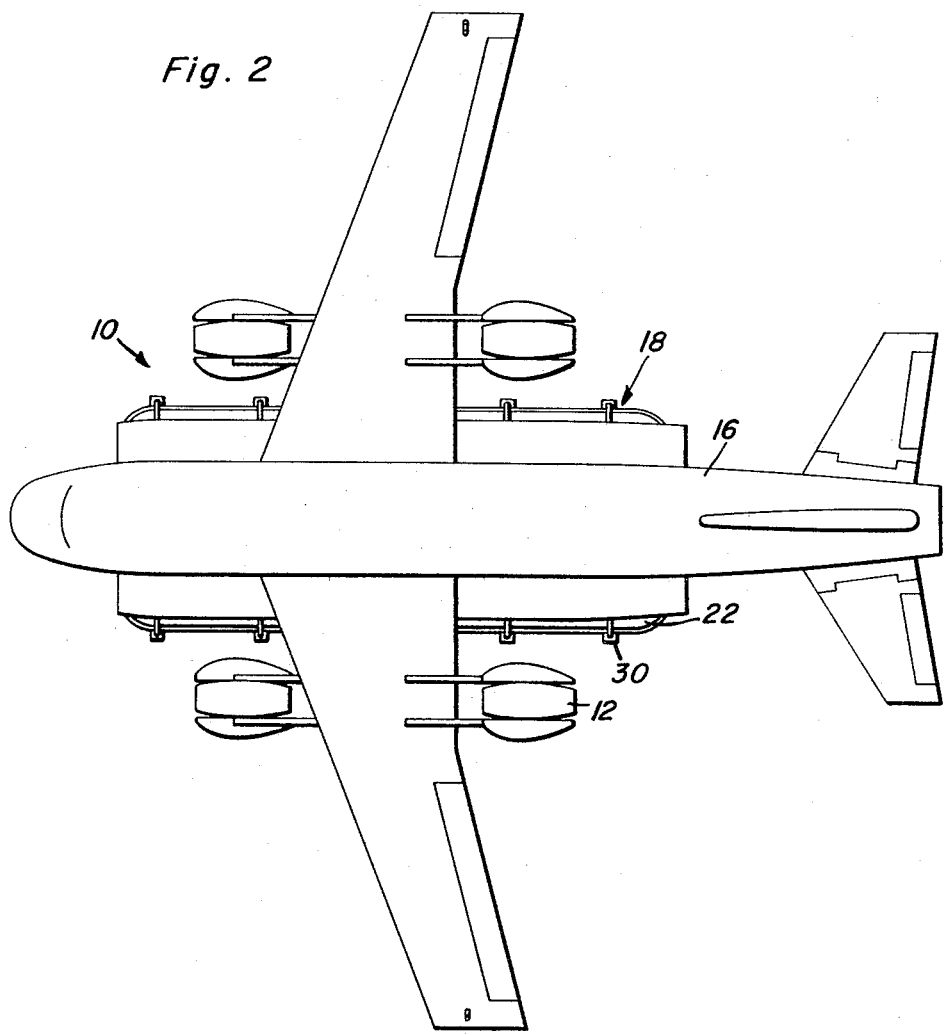
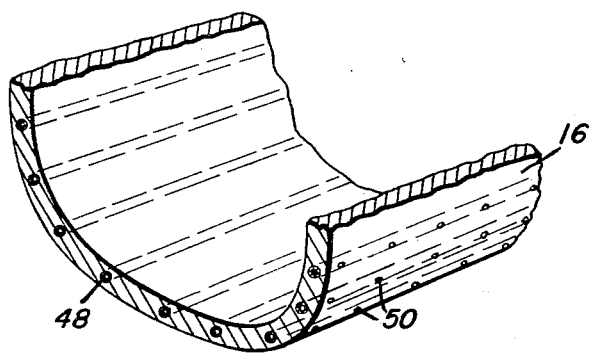
Shao-Tang Lee
INVENTOR.

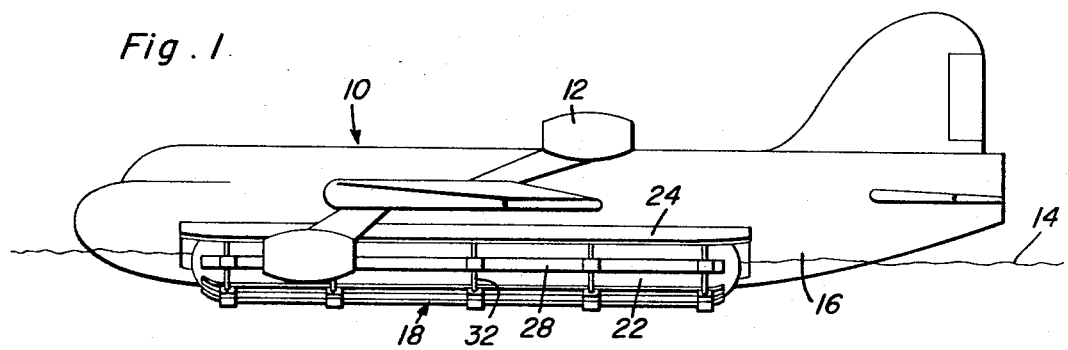
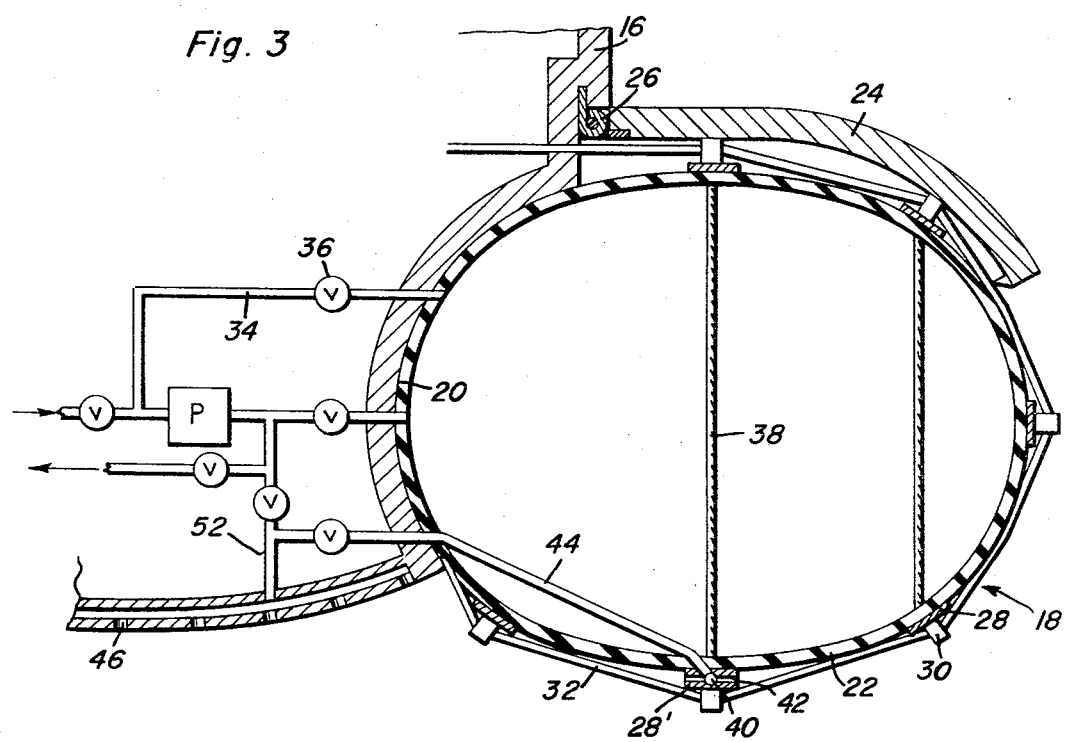
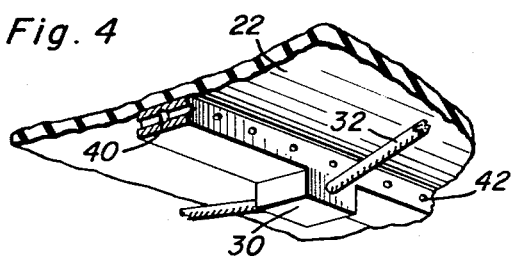
Shao-Tang Lee
INVENTOR.

United States Patent Office 3,297,280
Patented Jan. 10, 1967

3,297,280
AIRCRAFT WITH INFLATABLE LANDING GEAR
Shao-Tang Lee, 25 Chi-Kuang St.,
Taichung, Taiwan, China
Original application June 15, 1964, Ser. No. 375,391. Divided and this application Sept. 22, 1965, Ser. No. 489,126
8 Claims. (Cl. 244—105)

This application is a division of application Serial No. 375,391, filed June 15, 1964, which is in turn a continuation-in-part of application Serial No. 219,652, filed August 27, 1962, now Patent No. 3,165,280.

The invention set forth herein generally relates to landing gear for aircraft, and is more particularly concerned with inflatable pontoon-type landing gear for use in conjunction with vertical take-off aircraft wherein landing on water is desired.

One of the primary objects of the instant invention is to provide air inflatable landing and support pontoons wherein the air expelled upon a collapsing of the pontoons is utilized as a means for reducing surface tension between the aircraft and the water, thereby destroying any adhesion which might have developed therebetween and which would tend to interfere with the taking off of the aircraft.

Another significant object of the instant invention is to provide collapsible pontoons which, upon being collapsed, are compactly received within recesses defined along the opposite sides of the fuselage so as to in no way detract from the normally desired unencumbered shape.

Also, it is intended that the instant invention, although unique in structure and operation, constitute a relatively simple construction capable of effectively performing in a trouble-free manner.

Basically, in achieving the above objects, it is contemplated that a vertical take-off aircraft be provided with elongated inflatable pontoons, one along each side of the fuselage mounted within suitable selectively closable recesses whereby, upon a collapsing of the pontoons, a smooth uninterrupted fuselage surface is provided. In addition, the pontoons are to be operatively associated with control means for the selective introduction and withdrawal of pressurized air whereby the inflation of the pontoons can be effected. These control means are simultaneously operatively associated with discharge ports through both the bottom of the fuselage and the lowermost of a series of reinforcing ribs on the pontoons themselves whereby a discharge of air through these ports is possible so as to destroy any adhesion between the aircraft and the body of water within which it is positioned, this being particularly significant during a vertical taking off of the aircraft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an aircraft having the construction of the instant invention incorporated therein;

FIGURE 2 is a top plan view of the aircraft;

FIGURE 3 is an enlarged partial cross-sectional view through that portion of the aircraft incorporating the structure of the instant invention;

FIGURE 4 is a partial perspective view detailing the lowermost pontoon rib and the associated elements; and FIGURE 5 is a partial perspective view detailing a modified form of fuselage.

Referring now more specifically to the drawings, reference numeral 10 is used to generally designate an aircraft, this aircraft preferably being of the vertical take-off type and including rotatably mounted motors 12 of any suitable type whereby a vertical landing and take-off from a body of water 14 can be effected. The fuselage 16 of the aircraft 10 includes, along the lower sides thereof, a pair of elongated pontoons or frog sacks 18 provided so as to act as floats. Each of these pontoons 18 is received within a longitudinally extending recess 20 along one side of the belly portion of the plane 10. The pontoon 18 itself includes an elongated inflatable member 22 which, when collapsed, is completely receivable within the recess or fuselage groove 20 and closed therein by a hinge mounted lid or cover 24. This cover 24 is continually biased toward the closed position by spring means 26 and includes a suitable lock means for retaining the lid closed, such lock means not having been specifically illustrated in the drawings.

The inflatable member or sack 22 has a plurality of reinforcing ribs 28 fixed thereto and extending longitudinally therealong. These ribs 28 are provided with a series of circumferentially alined cable guides 30 through which a controlled cable 32 extends, this cable having one end thereof fixed to the recess forming wall adjacent the bottom of the recess, and the opposite end thereof projecting into the fuselage adjacent the upper end of the recess for engagement with a suitable control mechanism whereby a pull may be exerted thereon in a manner so as to assist in collapsing the pontoons 18 neatly into the recess 20.

Inflation and deflation of the pontoons 18 is effected through pump fed air lines 34 having control valves 36 therein, this being schematically illustrated in FIGURE 3. Limit ropes 38 are provided within each inflatable member 22 itself so as to assist in retaining the inflatable member 22 in the desired oval shape shown in the drawings.

Basically, inflation of the pontoons 18 is achieved by introducing pressure into the inflatable members 22 sufficient so as to result in an expansion of the inflatable members to a degree which will enable a proper supporting of the plane 10. This may be done either after a release of the corresponding lids 24, or prior to a release thereof. If the pressure is introduced prior to a release of the lids, the subsequent release thereof will result in an immediate outward expansion of the pontoons 18.

The collapse of the pontoons 18 is achieved through a combined withdrawal of the air by the pump unit and a compacting of the inflatable members 22 through the control cables 32 which encircle the inflatable members. As the inflatable members 22 are retracted into the corresponding recesses 20, the covers or lids 24 close toward automatic locking engagement with the fuselage 16. It is contemplated that the air exhausted from the collapsing pontoons 18 be directed downwardly so as to effect a reduction in the surface tension or adhesion which will develop between the bottom of the aircraft 10 and the surface of the water 14. Accordingly, the lowermost pontoon reinforcing rib on each pontoon 18, this rib being generally indicated by reference numeral 28', is provided with an axial air passage 40 along substantially the full length thereof in conjunction with a plurality of laterally directed passages 42 spaced there along and communicating with the exterior. A flexible air line 44, schematically illustrated in FIGURE 3, receives the discharging air from the pontoon 18 through the basic pump unit for expelling through the lateral passages 42. In addition, similar air discharge ports are to be provided along and about a substantial portion of the belly of fuselage 16. This can be accomplished either by providing a hollow double wall belly, as illustrated in FIGURE 3, with the discharge ports 46 being laterally and longitudinally spaced therein, or through a series of air tubes 48, referring to FIGURE 5, embedded within the belly of the fuselage 16 and extending longitudinally there along. In the latter case, each of the air tubes 48 will of course have discharge ports or apertures 50 communicating with the exterior of the aircraft. The exhaust air from the pontoons 18 will be introduced into the fuselage air spaces, either between the double walls or within the elongated air tubes 48, through a suitable air line 52 also schematically illustrated in FIGURE 3 in conjunction with the basic pump unit. With regard to the form of the invention illustrated in FIGURE 5, it will of course be appreciated that some conventional form of transversely orientated manifold will be necessary.

While the pumping unit has only been schematically illustrated, a more detailed explanation thereof is not deemed necessary inasmuch as any suitable pump might be used in conjunction with valved air lines communicating with the pontoons 18, air discharging rib 28', and aperture-containing fuselage belly, in conjunction of course with at least one intake line communicating with the atmosphere.

From the foregoing, it should be appreciated that a highly novel structure has been defined wherein a pair of inflatable pontoons are incorporated into an aircraft in conjunction with specifically provided air discharge holes located both in the belly of the fuselage and along the bottoms of the pontoons whereby the air exhausted from the pontoons can be utilized so as to effect a reduction of the surface tension which will develop between the aircraft and the surface of the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an aircraft, an elongated fuselage, air expansible pontoon means mounted thereon for enabling a landing of the aircraft on water, means for selectively introducing and extracting air from said pontoon means, and means for discharging the air extracted from said pontoon means downwardly relative to said aircraft along a substantial portion of the length thereof so as to effectively reduce surface tension between the aircraft and the water on which it floats, said means for discharging air downwardly including internal air chamber means within the belly portion of said fuselage, a plurality of downwardly directed air ports communicating said air chamber means with the exterior of the fuselage, and air line means selectively communicating the pontoon means with the air chamber means.

2. The structure of claim 1 wherein said air chamber means is defined by a pair of spaced walls.

3. The structure of claim 1 wherein said air chamber means consists of a plurality of elongated independent air tubes, each including a plurality of said air ports therein.

4. The structure of claim 1 including elongated air tube means mounted on said pontoon means at generally the low point thereof, outwardly directed air ports within said air tube means, and means selectively communicating said air tube means with the pontoon means for effecting a discharge of a portion of the air extracted from the pontoon means through said last-mentioned air ports.

5. The structure of claim 1 wherein said pontoon means comprises a pair of elongated inflatable members, one orientated along each side of the fuselage, said fuselage including a pair of elongated recesses defined therein receiving said inflatable members, closure means for closing each recess upon a deflation of the corresponding member, and a plurality of longitudinally extending reinforcing ribs along each member, the lowermost rib on each member comprising a portion of the air discharging means and including a longitudinal air passage therein and a plurality of air ports communicating the passage with the atmosphere.

6. The structure of claim 5 including cable means encircling said members for effecting a physical collapsing thereof and consequently an expelling of the air therein.

7. In an aircraft, an elongated fuselage, air expansible pontoon means mounted thereon for enabling a landing of the aircraft on water, means for selectively introducing and extracting air from said pontoon means, and means for discharging the air extracted from said pontoon means downwardly relative to said aircraft along a substantial portion of the length thereof so as to effectively reduce surface tension between the aircraft and the water on which it floats, said means for discharging air downwardly including elongated air tube means mounted on said pontoon means at generally the low point thereof, outwardly directed air ports within said air tube means, and means selectively communicating said air tube means with the pontoon means for effecting a discharge of a portion of the air extracted from the pontoon means through said last-mentioned air ports.

8. In an aircraft, an elongated fuselage, air expansible pontoon means mounted thereon for enabling a landing of the aircraft on water, means for selectively introducing and extracting air from said pontoon means, and means for discharging the air extracted from said pontoon means downwardly relative to said aircraft along a substantial portion of the length thereof so as to effectively reduce surface tension between the aircraft and the water on which it floats, said pontoon means comprising a pair of elongated inflatable members, one orientated along each side of the fuselage, said fuselage including a pair of elongated recesses defined therein receiving said inflatable members, closure means for closing each recess upon a deflation of the corresponding member, and a plurality of longitudinally extending reinforcing ribs along each member, the lowermost rib on each member including a longitudinal air passage therein and a plurality of air ports communicating the passage with the atmosphere, thereby constituting said means for discharging air downwardly relative to said aircraft.

References Cited by the Examiner

UNITED STATES PATENTS

| 1,693,773 | 12/1928 | Anderson | 244—105 |
| 2,131,528 | 9/1938 | Soyer | 244—107 |
| 2,364,845 | 12/1944 | Glen | 244—105 |
| 3,004,737 | 10/1961 | Boyle et al. | 244—105 |

FERGUS S. MIDDLETON, *Primary Examiner.*

LARRY C. HALL, *Examiner.*

P. E. SAUBERER, *Assistant Examiner.*